3,510,337
METHOD OF PLASMA SPRAYING OF TETRAFLUOROETHYLENE - HEXAFLUOROPROPYLENE COPOLYMER
Albert E. Katzer, Pittsburgh, Pa., and Robert O. Houghtaling, Detroit, Mich., assignors to General Motors Corporation, Detroit, Mich., a corporation of Delaware
No Drawing. Filed Jan. 26, 1967, Ser. No. 611,827
Int. Cl. B28b 7/38
U.S. Cl. 117—5.3     5 Claims

ABSTRACT OF THE DISCLOSURE

This invention relates to the coating of objects with fluorocarbon resins, and more particularly to a method of plasma spraying a thick coating of tetrafluoroethylene-hexafluoropropylene copolymer onto the surface of a metal article. This method is particularly useful in coating the interior walls of a mold with tetrafluoroethylene-hexafluoropropylene copolymer. The coating serves as a mold release agent since the slippery surface provided by the fluorocarbon resin permits the molded articles to be readily removed from the mold.

---

Fluorocarbon resins including polytetrafluoroethylene, and tetrafluoroethylene - hexafluoropropylene copolymer are widely used as coating materials due to their ability to provide a low friction surface. For example, a polytetrafluoroethylene coating on the interior walls of a mold serves as an excellent mold release agent, since its slippery surface enables the molded articles to be readily removed from the mold. The polytetrafluoroethylene mold coatings presently being used in the molding industry are 1 to 3 mils thick and are formed by flowing, spraying or brushing a polytetrafluoroethylene aqueous dispersion onto the interior walls of the mold and subsequently sintering the coated mold in an oven at a temperature of 700 to 725° F. The sintering step is required to provide a bond between the polytetrafluoroethylene coating and the metal. Molds having a polytetrafluoroethylene coating 1 to 3 mils thick thereon may be used satisfactorily in continuous service for up to two weeks, at which time the coating has been worn sufficiently so that it is no longer serviceable. Molds having a tetrafluoroethylene-hexafluoropropylene copolymer coating thicker than 1 to 3 mils, for example in the range of 10 mils thick, are desirable in view of the increased number of times the mold may be used. However, prior to this invention it was not possible to form a smooth, adherent fluorocarbon resin coating on the walls of a mold which had a thickness of 5 or more mils. For example, when several polytetrafluoroethylene coatings 2 or 3 mils are applied onto a metal surface by repeating the aqueous dispersion method of coating and sintering, it was found that the second polytetrafluoroethylene coating does not adhere properly to the first coating. Attempts to apply a polyfluoroethylene coating thicker than 3 mils in one application of the aqueous dispersion coating step have not been satisfactory since the thick coatings which are applied by this method have a tendency to form undesirable cracks on the coating surface.

It is a primary object of this invention to provide a method of applying a tetrafluoroethylene-hexafluoropropylene copolymer coating 5 to 30 mils thick onto a metal surface. It is another object of this invention to provide a method of applying a thick tetrafluoroethylene-hexafluoropropylene copolymer coating onto the walls of a mold suitable for use as a mold release agent. It is another object of this invention to provide a tetrafluoroethylene - hexafluoropropylene copolymer coated mold which will be usable for an extended period of time.

These and other objects are accomplished by a method in which a coating of tetrafluoroethylene-hexafluoropropylene copolymer is applied to a heated mold surface by using a plasma spray gun and subsequently curing the coating at an elevated temperature for a time sufficient to remove any bubbles from the surface of the tetrafluoroethylene-hexafluoropropylene copolymer coating without degrading the coating.

Other objects and advantages of this invention will be apparent from the following detailed description wherein a preferred embodiment of the present invention is clearly shown.

In general, in the method of the present invention, the surface of the metal article such as the interior walls of a mold is first conditioned to prepare the surface for the plasma flame spraying step. The first conditioning step is a cleaning step to remove grease and other contaminates. This is accomplished by immersing the metal article for a short period of time of the order of 5 minutes in a dilute hydrochloric acid cleaning solution. The metal surface is then rinsed and air dried. Other types of conventional washing and rinsing methods such as liquid solvent, degreasing, vapor degreasing, or alkaline cleaner soaks may be used if they remove the grease from the metal surface being coated.

The metal surface is then subjected to grit blasting to remove any film or grease that was previously not removed. It has been found that aluminum oxide grit which passes through a —80 mesh American Standard Screen Sieve is effective in this operation. Other grit material as well as other grit sizes may be used.

The mold is then heated in an oven having a temperature between 400° and 750° F. It has been found that when a tetrafluoroethylene-hexafluoropropylene copolymer coating is applied onto a metal surface having a temperature between 400° and 750° F. the coating will adhere tightly to the metal surface. If the metal surface is at a temperature lower than 400° F. when the tetrafluoroethylene-hexafluoropropylene copolymer coating is applied, the coating does not adhere properly. If the metal surface is at a temperature greater than 750° F. when the coating is applied, the high temperature of the metal surface causes the tetrafluoroethylene-hexafluoropropylene copolymer to degrade to some extent thereby resulting in a coating having less desirable properties.

A plasma flame spray gun is used to apply the tetrafluoroethylene - hexafluoropropylene copolymer coating onto the heated metal surface. The plasma spray gun utilizes an electric arc in an ionizing atmosphere of an inert gas such as argon, helium, and the like, to generate a plasma flame. Argon is used in the preferred embodiment. The temperature of the plasma flame during the operation of the plasma spray gun has been estimated by people skilled in the art to be of the order of between 5 and 6,000° F. to 25 to 30,000° F. The temperature of the plasma flame in the plasma flame spraying of tetrafluoroethylene-hexafluoropropylene copolymer is in the low end of the range mentioned above. The temperature of the plasma must be high enough to soften the tetrafluoroethylene-hexafluoropropylene copolymer sufficiently for it to bond to the hot metal surface. The temperature must not be so high that it causes burning and/or degradation of the tetrafluoroethylene-hexafluoropropylene copolymer. The temperature is regulated by the amount of power or kilowatts used in generating the plasma flame. For example, in the plasma gun employed to spray fluorocarbon resins, 4 to 6 kilowatts of power provided the best results. It is to be realized that the power input is not an absolute measure of the temperature of the plasma generated since the design of the plasma gun will affect the temperature obtained for a given power input. Since the tetrafluoroethylene-hexafluoropropylene copolymer is only heated for a short period of time as it passes through the plasma gun, it does not reach the temperature of the plasma flame.

Finely divided tetrafluoroethylene-hexafluoropropylene copolymer powder is fed into the heating zone of the plasma spray gun from the attached hopper as is the standard practice with this type of plasma spray gun. The particle size of the tetrafluoroethylene-hexafluoropropylene copolymer is −80 to −325 mesh with −200 mesh being the preferred particle size. The tetrafluoroethylene-hexafluoropropylene copolymer is commercially available from E. I. du Pont de Nemours & Company as Teflon FEP fluorocarbon resin.

During the spraying operation the plasma spray gun is held a distance of 3 to 4 inches away from the metal surface for a period of time sufficient to give the desired coating thickness. Adherent coatings having a thickness of 5 mils up to 30 mils have been obtained. Coatings thicker than 30 mils, for example 60 mils, have been found to have cracks in the outer surface thereof.

The plasma sprayed tetrafluoroethylene-hexafluoropropylene copolymer coating adheres tightly to the metal article. The surface of the coating, however, is not smooth due to the bubbles in the coating. These bubbles are removed from the coating and a smooth outer coating surface is obtained by subjecting the coated article to a heating or curing step. This post-heating or curing step is done at a temperature above 700° F. and less than 825° F. for a time sufficient to smooth the outer surface by removing the bubbles without degrading the coating. The time of the heating or curing step depends upon the temperature employed and will vary from approximately 15 to 20 minutes around 800° F. to about 60 minutes at 725° F.

The following examples are given to illustrate the invention but are not to be construed as limiting the invention thereto.

EXAMPLE NO. 1

A steel panel was dipped in dilute hydrochloric acid and rinsed in water. The surface of the metal panel was grit blasted with aluminum oxide grit. The panel was heated in an oven having a temperature of 550° F. As soon as the panel was removed from the oven, it was sprayed with tetrafluoroethylene-hexafluoropropylene copolymer using a plasma spray gun for a time sufficient to obtain a coating 15 mils thick. Argon was the inert gas which was used and a power of 5 kilowatts was used to obtain the proper temperature of the plasma in the plasma spray gun. The coated article was then placed in an oven having a temperature of 750° F. for 30 minutes. Upon cooling, the resultant coated panel had a smooth tetrafluoroethylene-hexafluoropropylene copolymer coating thereon which adhered tightly to the panel.

EXAMPLE NO. 2

A panel was prepared as described in Example No. 1. The panel was heated in an oven until it attained a temperature of 600° F. Upon removing the panel from the oven, it was sprayed with tetrafluoroethylene-hexafluoropropylene copolymer using a plasma flame spray gun until the coating was 30 mils thick. The coated panel was then placed in an oven for 20 minutes at 800° F. A smooth, adherent tetrafluoroethylene-hexafluoropropylene copolymer coating on the metal substrate was obtained.

These tetrafluoroethylene-hexafluoropropylene copolymer coatings are particularly useful on molds and have been successfully used in this type of application. When used for mold applications, the thick coating provides a mold which can be used an extended period of time, for example in the range of 10 weeks, in contrast to 2 weeks with the prior art, 1 to 3 mils thick polytetrafluoroethylene coatings. This method of applying a thick tetrafluoroethylene-hexafluoropropylene copolymer coating can be utilized on a wide variety of applications which presently now have a thin fluorocarbon resin coating thereon.

While the invention has been described in terms of specific examples, it is to be understood that it is not limited thereby except as defined in the following claims.

What is claimed is:

1. A method of coating the surface of a metal article with tetrafluoroethylene-hexafluoropropylene copolymer comprising the steps of heating said surface of said article to a temperature between 400° F. and 750° F., plasma flame spraying a coating of 5 to 30 mils thick of tetrafluoroethylene-hexafluoropropylene copolymer on said heated metal surface and heating the coated metal article to a temperature greater than 700° F. and less than 825° F. for a time sufficient to remove all bubbles from said coating without degrading said coating whereby an adherent, smooth, bubble-free coating is formed.

2. A method as described in claim 1 wherein said heating step is at a temperature between 790° F. and 805° F. for 15 to 20 minutes.

3. A method of applying a plastic mold release agent onto the walls of a mold to form an improved mold comprising the steps of heating the walls of said mold to a temperature between 400° F. and 750° F., plasma flame spraying a coating 5 to 30 mils thick of tetrafluoroethylene-hexafluoropropylene copolymer on said metal mold and heating the coated metal mold to a temperature greater than 700° F. and less than 825° F. for a time sufficient to remove all bubbles from said coating without degrading said coating whereby an adherent, smooth, bubble-free coating is formed which acts as a mold release agent for an extended period of time.

4. A metal article comprising a metal base and a smooth, adherent, bubble-free tetrafluoroethylene-hexafluoropropylene copolymer coating 5 to 30 mils thick wherein said thick coating provides a low friction surface for an extended period of time.

5. An improved tetrafluoroethylene-hexafluoropropylene copolymer coated mold for the molding of plastics comprising a mold base portion of metal and an adherent, smooth, bubble-free tetrafluoroethylene-hexafluoropropylene copolymer coating 5 mils to 30 mils thick on the interior surface of said mold wherein said coating acts as a mold release agent for an extended period of time.

References Cited

UNITED STATES PATENTS

| 2,844,489 | 7/1958 | Gemmer | 117—22 X |
|---|---|---|---|
| 2,944,917 | 7/1960 | Cahne | 117—49 |
| 3,179,784 | 4/1965 | Johnson | 117—93.1 |
| 3,266,107 | 8/1966 | Grotebe | 117—5.3 X |
| 3,279,936 | 10/1966 | Forestek | 117—5.3 X |
| 3,283,117 | 11/1966 | Holmes et al. | 117—105.2 X |
| 3,378,391 | 4/1968 | Winzeler et al. | 117—93.1 |

WILLIAM D. MARTIN, Primary Examiner

P. ATTAGUILE, Assistant Examiner